May 3, 1949.  J. MERCIER  2,468,939
MOUNTING FOR HYDRAULIC SHOCK ABSORBERS
Filed Sept. 8, 1943
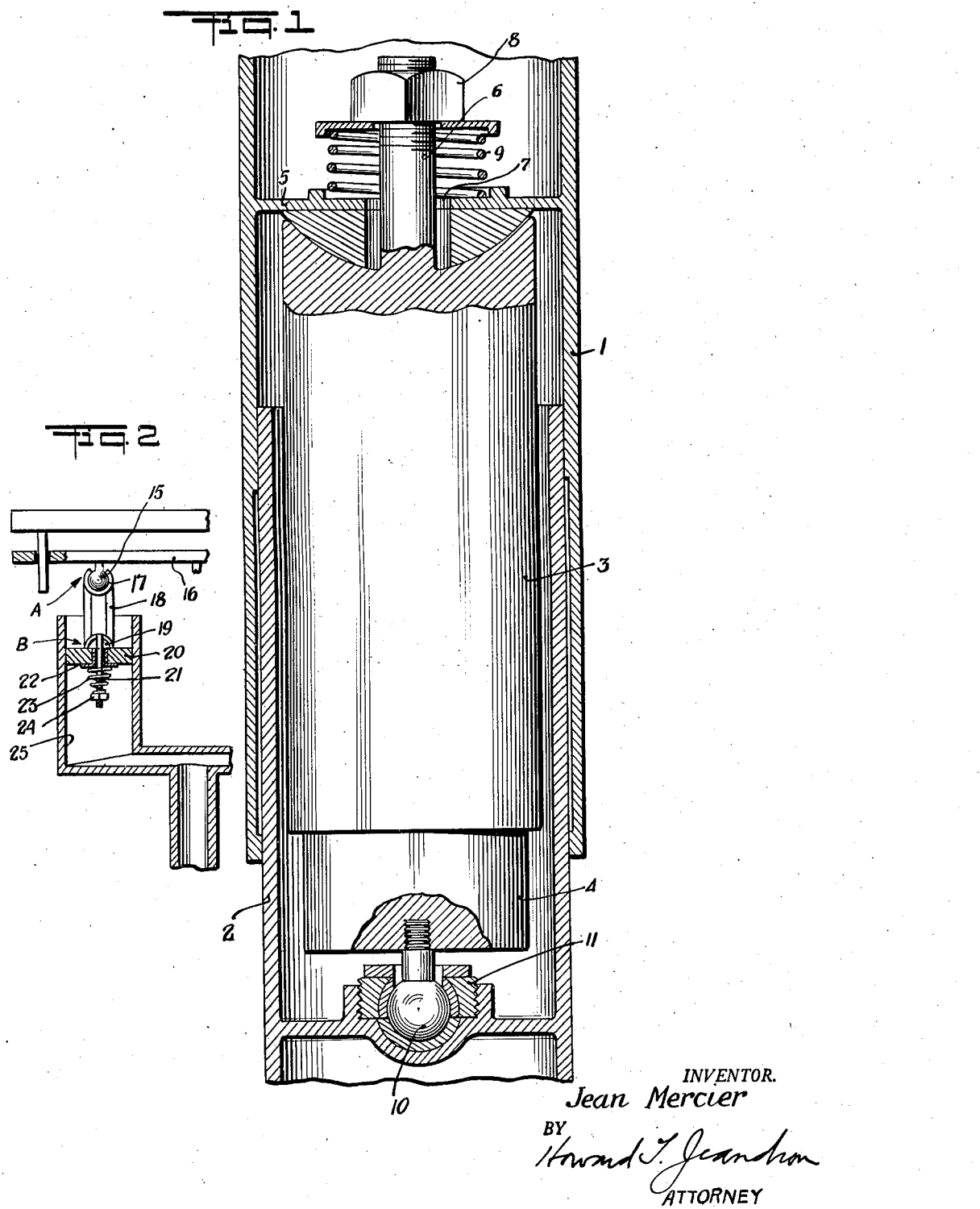
INVENTOR.
Jean Mercier
BY
Howard T. Jeandron
ATTORNEY Patented May 3, 1949

2,468,939

UNITED STATES PATENT OFFICE 2,468,939

MOUNTING FOR HYDRAULIC SHOCK ABSORBERS

Jean Mercier, New York, N. Y.

Application September 8, 1943, Serial No. 501,534

3 Claims. (Cl. 188—100)

The present invention pertains to a mounting for fluid actuated reciprocating members and more particularly to a plurality of piston cylinder units in which one member is subjected to heavy loads in the presence of lateral stresses.

Reciprocating members of this type are in general used with steam and combustion engines, to operate press heads, shock absorbers and many other devices. When the fluid pressure developed attains high values such as 10,000 p. s. i., a problem arises as to sealing the reciprocating members with respect to each other so as to avoid leaks of fluid without unduly increasing their friction. To solve problems of this kind it has been suggested that sealing glands of metal or the like be used in which the surface to be sealed is engaged by a scraping edge supported on a rigid base portion by means of an elastic lip portion. Sealing glands of that type are described and claimed in my patent # 2,157,299 and in my copending application Serial No. 423,391, now U. S. Patent Number 2,350,123, issued May 30, 1944, but their use is not entirely safe in cases where the reciprocating members are subject to other than strictly axial stresses.

One of the reasons for this shortcoming is that lateral stresses cause an uneven wear of the reciprocating members. Such uneven wear will cause lateral displacements during the reciprocating operation of the members, and also the amplitude of these displacements will rapidly increase. Sealing glands of the aforesaid type will not yield to such displacements except for a relatively small amplitude. Accordingly, lateral stresses will — sooner or later — impart a condition to the reciprocating members in which the gland will be injured or even destroyed.

This weakness may impair the reliability of devices in which glands of the aforesaid type are used and make it necessary, when an injury or rupture in the gland has occurred, not only to replace the sealing means but also to replace, or to readjust, the reciprocating members so that the clearance between them does not exceed, at any point, the tolerance admissible with regard to the elasticity of the gland.

Problems of the same nature are found in instances in which lateral, or torsional, displacement of the reciprocating members are not merely a result of wear but are intentionally produced or tolerated. One example is the telescoping strut of an aircraft landing gear. Such struts can, of course, be built rigid enough to admit of none but axial displacements. But, in view of the economy in weight, it is desirable to reduce their strength and to tolerate temporary radial or torsional deformations. The sealing glands referred to above are very useful for sealing shock absorbers and they are generally used in connection with aircraft landing gears. If the latter are subject to the aforesaid deformations, such glands are not reliable because the amplitude of the deformations generally exceeds the elastic limits of the gland.

An object of the present invention is to overcome the aforesaid defects.

To that end, the reciprocating members are so mounted on their respective supports that the former remain free of a limited lateral movement with respect to the latter.

In this manner the reciprocating members are always perfectly centered and lateral stresses which may exist between the supports will not be transmitted to the same.

Further features may be gathered from the description of two embodiments, illustrated in the accompanying drawings in which Fig. 1 shows in section and partly in elevation an embodiment in which the present invention is applied to a landing gear for aircraft, and Fig. 2 shows also in section and partly in elevation, another embodiment in which the present invention is applied to a press actuating jack.

In Fig. 1, 1 and 2 designate the two telescoping tubes of an aircraft landing gear. A conventional shock absorber including a cylinder 3 and a piston 4 is affixed to tubes 1 and 2, respectively. An annular bracket 5 of semi-circular cross section which may be a part of or may be secured to tube 1 is provided with its semi-circular face contacting the cylinder 3, and which is also provided with a central opening 7. The adjacent end of cylinder 3 is oppositely curved to fit the face of the bracket and carries an extended threaded centerpiece 6 which extends through the opening 7 in bracket 5. The cross sectional dimensions of projection 6 should be so chosen as to leave an annular recess between the extension 6 and the annular bracket 5.

When assembling the landing gear, a spring 9 is placed over the extension 6 and a washer is placed over the end of the spring; then a nut 8 is threaded on to the extension 6 and turned down until the spring is under a slight amount of compression.

At the opposite end of the shock absorber piston 4 there is a spherical projection 10 which is threadably secured thereto and also engages a curved bracket 11 which is fitted to the spherical projection and is rigidly affixed to the tube 2.

Both ends of the shock absorber might be mounted in identical fashion, as described in connection with cylinder 3 or piston 4.

In another embodiment which is illustrated in Fig. 2, a spherical projection 15 affixed to a press head 16, shown at A, is enclosed in a fitted bracket 17 of corresponding shape integral with rod 18.

At B the other end of rod 18 has a concave—preferably spherical—surface which cooperates with a corresponding convex projection 19 on piston 20, which is mounted in a cylinder 25.

A projection 21 of rod 18 passes through the center of piston 20. Upon assembling the press the washer 22 and a spring 23 are applied against the lower surface of piston 20 and a nut 24 is screwed onto projection 21 until spring 23 is under suitable compression.

Due to this mounting, piston 20 is relieved from lateral stresses and may be sealed within cylinder 25 by a metallic gland (not shown) affording satisfactory tightness up to maximum pressure, or in the first embodiment the cylinders 3 and 4 are relieved from lateral stresses and may be sealed by a metallic gland to afford satisfactory tightness.

While the embodiments described above show the invention in connection with a landing gear and a hydraulic press, it is obvious that it can be applied, in similar manner, to any other device in which fluid actuated reciprocating members are used.

The foregoing description is not intended to limit the present invention which extends to all changes, modifications and equivalents within the scope of the appended claims.

What is claimed is:

1. A shock absorber which includes an inner and outer pair of telescoping members, a pair of universal joints, each one mounted in opposed relation at the opposite extremities of the telescoped members, the first said universal joint being in addition rigidly affixed to one member of the outer pair of telescoping members and the second said universcal joint being in addition loosely fitted but positively held by a spring fastening on the other telescoping member of said outer pair, said loose fitting universal joint allowing a limited lateral deflection of the outer pair of telescoping members from the normal axis of the shock absorber while retaining the axial alignment of the inner pair of mating telescoping members.

2. A shock absorber which includes a retaining outer pair of telescoping members and an inner pair of reciprocating members, the second pair being mounted within the first pair, the first pair forming an enclosing structure and the second pair formed of a pair of telescoping reciprocating members that are limited in their axial movement in telescoping, a pair of universal joints each one mounted in opposed relationship at opposite extremities of the telescoping members, between the mated outer pair and mated inner pair of telescoping members, the first said universal joint being rigidly affixed between the inner reciprocating member of the inner pair of telescoping members and the inner retaining member of the outer pair of telescoping members, and the second universal joint being secured with a limited degree of elasticity between the outer reciprocating member of the inner pair of telescoping members and the outer retaining member of the outer pair of telescoping members, and said two universal joints allowing a small degree of lateral deflection between said outer pair of telescoping members while retaining said inner pair of telescoping members free of said lateral deflection.

3. A shock absorber which includes a retaining outer pair of telescoping members and an inner pair of reciprocating members, the second pair being mounted within the first pair, the first pair forming an enclosing structure and the second pair formed of a pair of telescoping reciprocating members that are limited in their axial movement in telescoping, a pair of universal joints each one mounted in opposed relationship at opposite extremities of the telescoping members, between the mated outer pair and mated inner pair of telescoping members, one of said universal joints being bored through its center with a larger bore than the retaining member and the retaining member being yieldably secured to allow a limited degree of deflection of the retaining member from its normal central axis, means to maintain the inner pair of telescoping members in axial alignment when the outer pair of telescoping members are not in axial alignment due to lateral stresses.

JEAN MERCIER.

REFERENCES CITED

The following references are of record in the file of this patent:

UNITED STATES PATENTS

| Number | Name | Date |
|---|---|---|
| 1,472,086 | Pierson | Oct. 30, 1923 |
| 2,182,648 | Solomon | Dec. 5, 1939 |
| 2,324,281 | Cowey | July 13, 1943 |

FOREIGN PATENTS

| Number | Country | Date |
|---|---|---|
| 670,589 | France | Aug. 19, 1929 |